United States Patent [19]

Hardtke

[11] Patent Number: 5,018,700
[45] Date of Patent: May 28, 1991

[54] SUSPENSION DEVICE FOR CONVEYING LOADS, PARTICULARLY PIPES

[75] Inventor: Hans-Herlof Hardtke, Zeven, Fed. Rep. of Germany

[73] Assignee: Lisega GmbH, Fed. Rep. of Germany

[21] Appl. No.: 351,621

[22] Filed: May 15, 1989

[30] Foreign Application Priority Data

May 17, 1988 [DE] Fed. Rep. of Germany ....... 3816673

[51] Int. Cl.⁵ .............................................. F16L 3/00
[52] U.S. Cl. .................................... 248/571; 248/613; 267/140.3; 267/172
[58] Field of Search ............... 248/550, 565, 566, 610, 248/612, 613, 631, 59, 60, 327, 571; 267/140.3, 140.5, 151, 172

[56] References Cited

U.S. PATENT DOCUMENTS

| | | | |
|---|---|---|---|
| 3,606,233 | 9/1971 | Scharton | 248/550 |
| 3,895,788 | 7/1975 | Liesegang | 248/571 |
| 4,613,119 | 9/1986 | Hardtke | 248/613 |

FOREIGN PATENT DOCUMENTS 2623929 12/1977 Fed. Rep. of Germany ...... 248/571

Primary Examiner—Ramon O. Ramirez
Assistant Examiner—Robert A. Olson
Attorney, Agent, or Firm—Diller, Ramik & Wight

[57] ABSTRACT

A suspension system for supporting pipes under generally constant tension comprises a main spring system including a main spring located between a suspension portion and a load-bearing portion for applying spring-biasing forces to the suspension portion. An additional spring system includes an additional spring which compensates for variations in the spring-biasing forces of the main spring through associated cam and cam followers. An auxiliary hydraulically operated mechanism is provided for applying a supplementary predetermined biasing force to increase or decrease the biasing forces of the main springs in response to detected value/parameters.

20 Claims, 3 Drawing Sheets

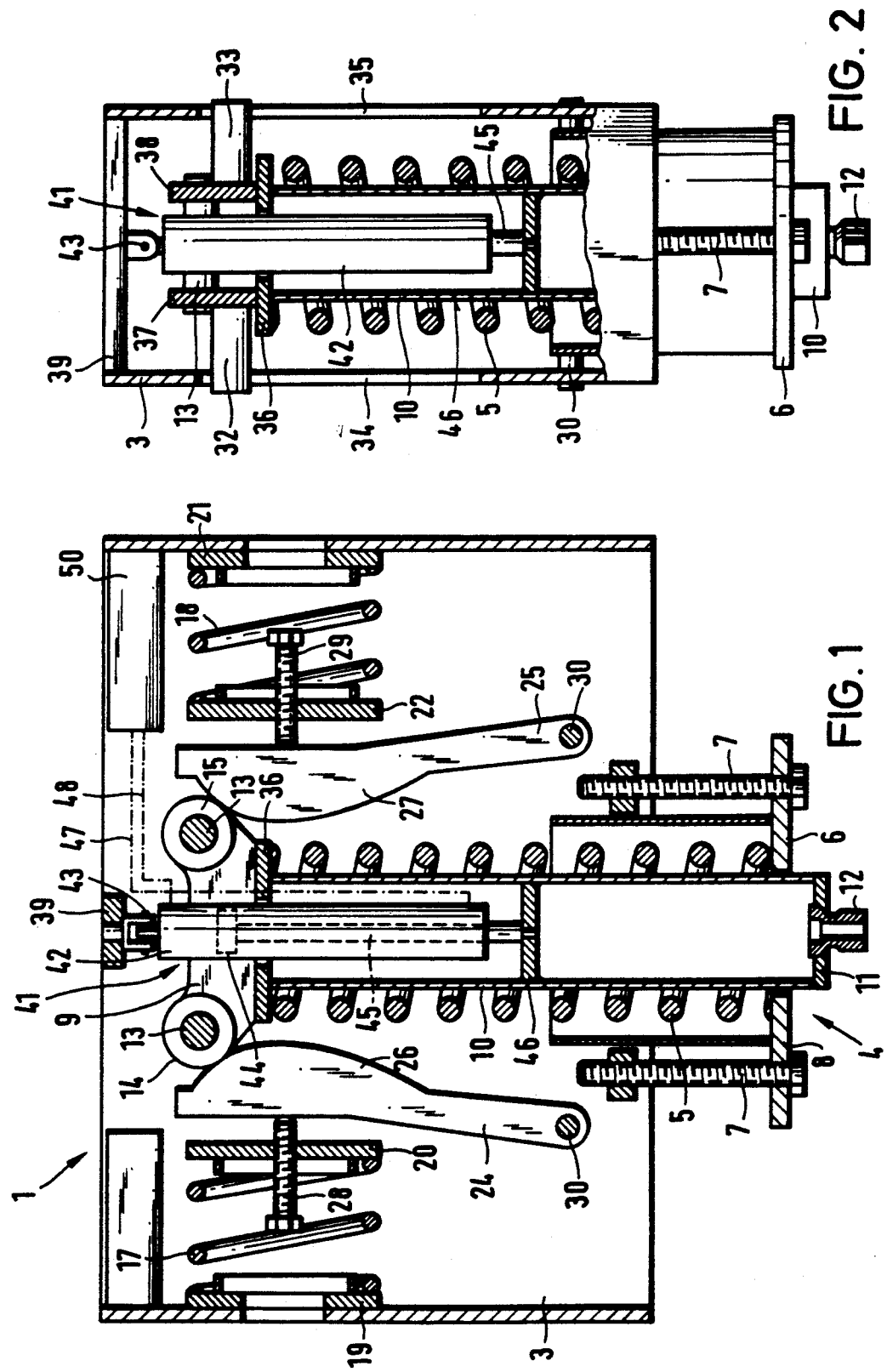

SUSPENSION DEVICE FOR CONVEYING LOADS, PARTICULARLY PIPES

BACKGROUND OF THE INVENTION

The invention relates to a constant tension suspension device or mechanism for supporting loads, particularly pipes, comprising a main spring system arranged between the suspension portion and the load-bearing portion for receiving the load, and an additional spring system for compensating for variations in tension and compressive forces of the main spring system and for cooperation with a cam element through a roll with the cam element being mounted as an independent swing lever between the additional spring system and the main spring system.

In constant suspension systems used as kinetically compensatory mounting supports for pipes conducting hot fluid, the mechanical elements subjected to the pipe loads accommodate pipe movements created by thermal expansion. The weight of the pipe is kept generally in balance by self-adjustment of the constant suspension system. The sum of existing deviations and additional stress resultant therefrom in the pipe system predominantly remain within an acceptable range.

However, due to external influences or to the direct behavior of the constant suspension system, the pipes or other components may move contrary to expectations, thus not achieving the desired movements as, for example, movement from a cold position to a hot position or vice versa. In special cases, the sum of actual deviations may exceed the acceptable range and, due to such additional secondary tension forces, the life of the constant suspension system, its components and the pipe may be considerably reduced over long periods of use.

Deviations may be due, for instance, to influences in pipe statics which are not always detectable or predictable, to practical variations, such as actual load distribution from the theoretical, to wall thickness tolerances of the pipes (unless they are weighed and weighted prior to installation to compensate for weight differences), to insulating weights which can not be exactly detected/measured in the forward path of movement, to mechanical friction and manufacturing tolerances of the suspension system and its components, and to fatigue of the springs. Moreover, cumulative deviations in long-leg pipe suspension systems of the so-called soft type are very unfavorable. Displacements of the vertical strand may be hindered partly or completely in the expansion leg even in the case of relatively slight deviations. In addition to these types of deviations and damage caused thereby, there are many other potentially dangerous problems, such as water shocks, e.g., caused by an improper descending gradient.

Accordingly, it is possible that the desired movements of the pipes from the cold position to the hot position or vice versa may not be achieved, and for specific/critical points of support, this might not be tolerable.

SUMMARY OF THE INVENTION

In view of the foregoing, it is an object of the invention to improve the passively reacting constant suspension mechanism of a constant tension suspension system by supplementing the reaction force with an active device so that load differences may be compensated for under control. The invention is characterized in that the constant suspension mechanism comprise an auxiliary integrated hydraulic means (servo) to provide an additional force to the main force and of a predetermined magnitude in both directions of the adjustment path.

Due to the auxiliary integrated hydraulic means of the constant tension suspension device, its correct position for the required load take-over is insured. Also, in case of a deviation or impediment, the constant suspension mechanism is always urged and moved into the correct position by the auxiliary means. The integration of the auxiliary hydraulic means also allows optional resetting. Further, the outer dimensions/size of the constant tension suspension device is unchanged, as compared to conventional devices, or is increased insignificantly. Due to the invention, one is always sure that the constant suspension device, even in case of unfavorable impediments, moves exactly into a precalculated/predetermined position corresponding to the operating condition of the particular installation.

In further accordance with the invention, the auxiliary hydraulic means is accommodated at the load pipe of the constant suspension mechanism cooperating with the additional spring system via cam elements. Suitably, a cylinder of the servo-hydraulic operated auxiliary means is hinged at the mounting of the constant suspension housing and the piston rod is secured to the load pipe of the constant suspension mechanism.

The invention also provides a control means for the servo-hydraulic operated auxiliary means which, in case of deviation from the desired load position of the constant suspension mechanism, is responsible for the operation of the servo-hydraulic operated auxiliary means only upon deviation from the desired load. By this means, the servo-hydraulic auxiliary means is only a correction means monitoring the correct function of the constant suspension mechanism and only becomes operative when, by any source of disturbance, the constant suspension mechanism is prevented from moving to the correct precalculated position in conformity with the constant suspension system design.

There are conventional pipe suspension systems which operate completely pneumatically by utilizing a compressed air cylinder. The pipes are adjusted in response to thermal conditions of the pipes and to the actual position of the piston rod(s) holding the pipes(s). The compressed air unit totally and continuously controls suspension corresponding to the loads applied to the pipes.

In order to determine the actual position of the constant suspension mechanism, a data measuring pick-up may cooperate with an element mounted at the load pipe. Another value measuring pick-up, e.g., a temperature feeler, may be mounted upon the constant suspension mechanism. The values/data of the measurement pick-ups are compared to each other and the servo-hydraulic operated auxiliary means is operated accordingly.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a schematic vertical longitudinal sectional view of a constant tension suspension mechanism of the invention, and illustrates an auxiliary servo-hydraulic mechanism for selectively controlling the constant suspension mechanism.

FIG. 2 is a side elevational view, partly in cross-section, and illustrates further details of the constant tension suspension mechanism.

DESCRIPTION OF THE PREFERRED EMBODIMENT

Figure 3:
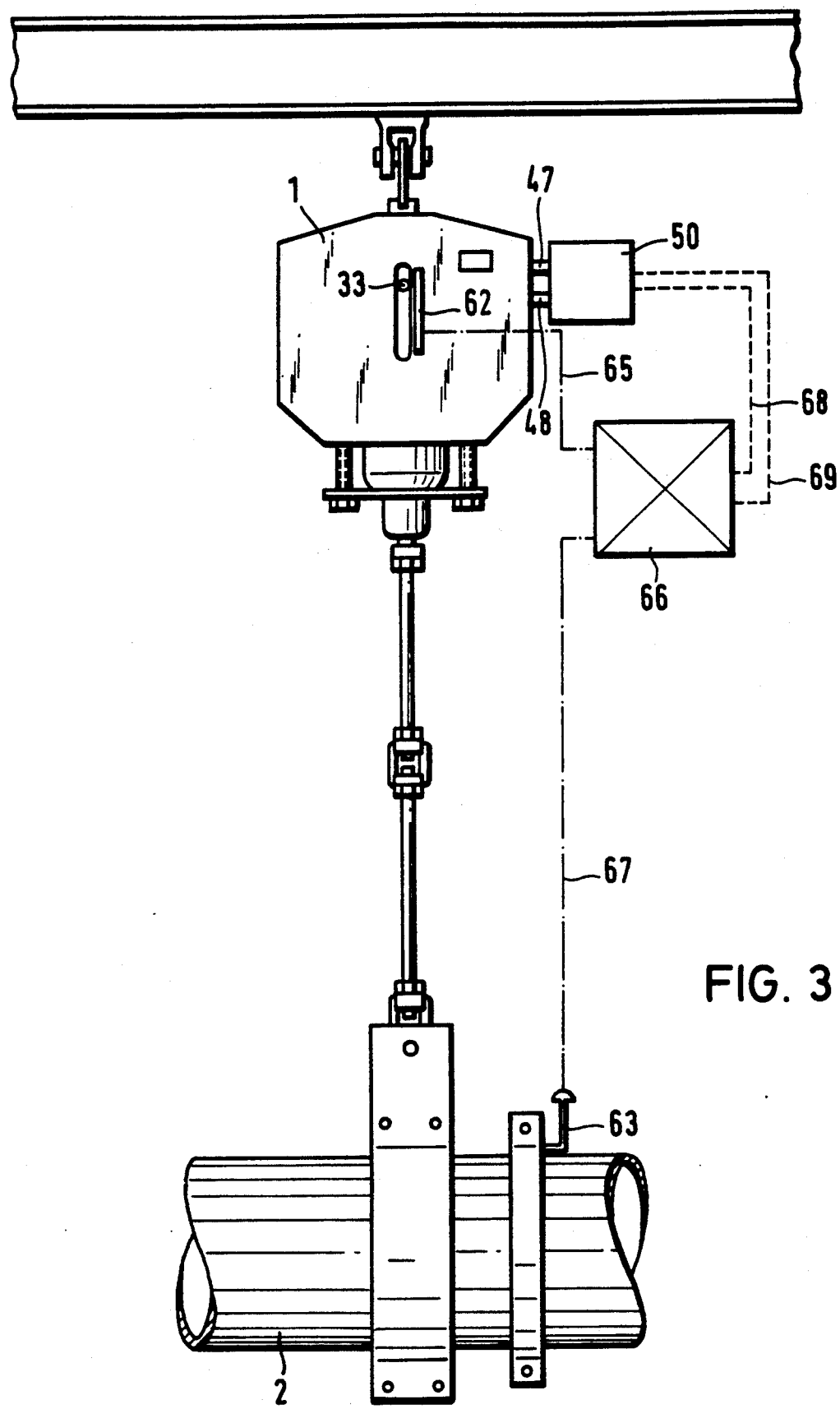
FIG. 3 is a schematic side elevational view of a suspension system, and illustrates in block diagram a data measurement pick-up and control system of the invention.

A novel constant tension suspension device or mechanism 1 (FIGS. 1 and 2) for moving loads, such as pipes 2 (FIG. 2), comprises a housing 3 designed as a suspension member in which a load-carrying portion 4 is under the influence of a load-receiving main spring or spring system 5 supported adjustably against a lower abutment 6 by means of threaded bolts 7 threaded to the housing 3 and passing freely through openings (unnumbered) of a lower cross traverse 8. Another end of the main spring 5 is supported by a head portion 9 serving as an abutment to which a sleeve or cylinder 10 is secured which projects beyond the lower abutment 6. The sleeve or cylinder 10 is closed by a plate 11 in which an oscillating member 12 is disposed to receive the load to be carried, e.g., a holder, a pipe line or the like (See FIG. 3). Both sides of the head portion 9 have shafts 13 on which rolls 14 and 15 are rotatably mounted.

Secondary or additional compression springs or spring systems 17 and 18 are provided for compensating for variations of tension and compression forces of the main spring 5 relative to a central position in order to maintain a desired suspension support force. The compression springs 17, 18 are mounted between abutments 19, 20 and 21, 22, respectively, and extend transverse (horizontal) to the main axis (vertical) of the main spring 5. Between the main spring 5 and the rolls 14, 15 carried by the head portions 9 and the additional springs 17, 18 there are provided cam arm swing levers 24, 25. The cam arm swing levers 24, 25 include cam elements or portions 26, 27, respectively, which cooperate with the rolls 14, 15, respectively, of the head 9 of the main spring 5. The swing levers 24, 25 are simultaneously influenced by and react with the main spring 5 and its rolls 14, 15 and the secondary or additional springs 17, 18. The swing levers 24, 25 may also instead be suspendingly supported. In neutral position, the additional springs 17, 18 and the cam elements 26, 27 are suitably provided in the upper or central region of the main spring system 5. Adjusting elements 28, 29 are preferably set-screws. The swing levers 24, 25 are pivoted on shafts 30 which are fixed to side walls (unnumbered) of the housing 3.

The head portion 9 and the sleeve 10 are guided for vertical movement by longitudinal slots 34, in which are slidably received transverse bolts 32, 33. To this effect, the upper abutment plate 36 is provided with upright plate elements 37, 38 to which the guide bolts 32, 33 are secured. A holder 39 is for mounting the constant suspension mechanism 1 through the housing 3 to a stationary frame or the like.

Servo-hydraulically operated auxiliary means 41 is integrated in the constant suspension mechanism 1 to act as an additional force of a predetermined intensity in both travel directions with respect to the main force.

The auxiliary servo-hydraulic means or unit 41 comprises a cylinder 42 which is connected by a joint 43 to the holder or mounting 39. The cylinder 32 houses a piston 44 connected to a piston rod 45 which is in turn firmly connected to a transverse wall 46 welded inside the sleeve 10. Hydraulic conduits 47 and 48 are connected to the rod and head ends, respectively, of the cylinder 42 and are connected to a hydraulic control assembly 50.

Figure 4:
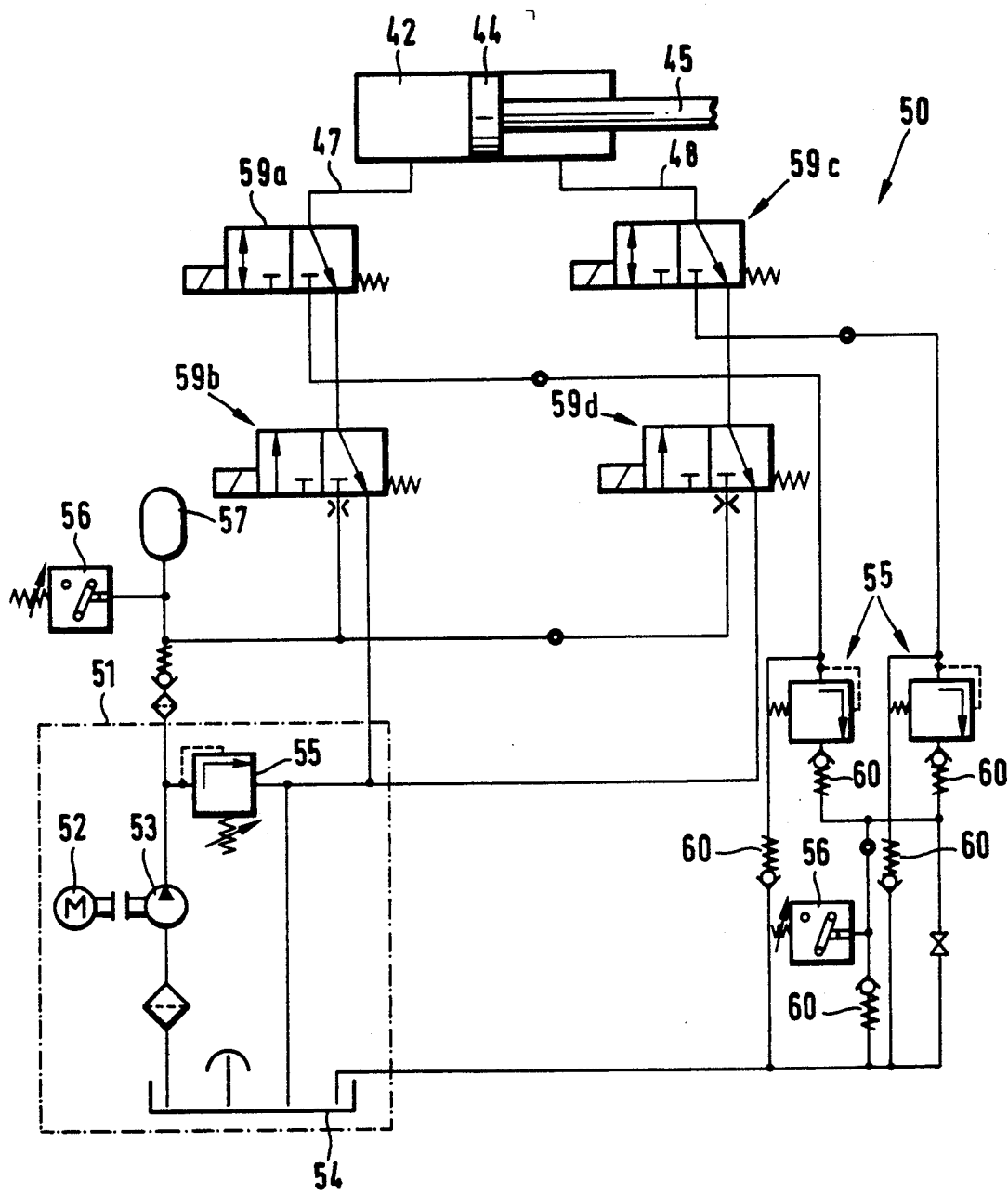
FIG. 4 is a schematic diagram and illustrates a hydraulic system of the invention.

The hydraulic control assembly 50 (FIG. 4) includes a pressure generating means 51 defined by a motor 52, a pump 53, a tank 54, a pressure-relief valve 55, a manometric switch 56 and a pressure reservoir 57. Four three-way valves 59a–59d are disposed in pairs 59a, 59b and 59c, 59d in the respective conduits 47 and 48 between the auxiliary servo-hydraulic unit 41 and the pressure generating means 51 to 57. Several nonreturn valves 60 are mounted in the conduits.

A data pick-up 62 (FIG. 3), which cooperates with an element applied to the sleeve 10, is mounted at the outside of the housing 3 of the constant suspension mechanism 1 to determine the actual position of the latter to thereby control the operation of the hydraulically operated auxiliary means 41. Preferably, use is made of the guide bolts 32 or 33 which externally visually indicate the movements of the sleeve 10. The data pick-up 62 is path-dependent. Another data pick-up 63 is applied to the suspended/supported member, e.g., pipe 2, and preferably comprises a temperature scanner which measures the temperature of the pipe. The temperature is an accurate measure of the desired value/data required to respond to and control movement of the constant suspension mechanism as pipe temperature increases or decreases due to the variation in the liquid temperature flowing therethrough.

The servo-hydraulic auxiliary mechanism or assembly 41 is controlled by constantly comparing desired and actual values/data obtained in different ways, e.g., by mechanical, electric or preferably electronic means.

From the measured value pick-up 62 for determining the "travel" position of the constant tension suspension mechanism 1, a control line 65 extends to control means 66, while from the measured value pick-up 63, e.g., a resistance thermometer, a control line 67 also extends to the control means 66 operating electronically or as an in-process computer. From the control means 66, lines 68 and 69 extend to the hydraulic control assembly 50 by which additional force is generated and transmitted by the piston cylinder unit 42, 44, 45 to the sleeve 10 of the constant suspension mechanism 1.

It is insured by the hydraulic system 50 that an additional force of at least 10 percent (10%), but as high as 50 percent (50%), in both directions of the nominal load of the constant suspension mechanism may be applied thereto. By the measured value pick-up 63 mounted at the outer wall of the member (pipe) to be carried/suspended, the temperature is measured. By the control means or control assembly 50, the measured value is converted into the required travel position of the constant suspension mechanism 1. The latter position is the desired position of the piston rod 45. The other measured value pick-up 62 which directly taps the position at the constant suspension mechanism 1 represents the actual position of the constant suspension mechanism 1. In case of a difference between desired and actual values, the hydraulic control assembly 50 moves the servo-hydraulic mechanism 41 into the desired position by a corresponding control of the magnetic valves 59(a–d)

(up or down movement of the piston rod 45). However, the servo-hydraulic mechanism 41 is only operated in the event of a difference detected between the actual and desired positions of the constant suspension mechanisms 1 by means of the measured value pick-ups 62, 63. A constant comparison, preferably effected electronically, is made between the desired value, based on the measured temperature, and the actual value based on the measured travel at the sleeve 10. If there is a difference between desired and actual values, the servo-hydraulic mechanism 41 is enabled, and via the selectively operated magnetic valves 59a–d, the hydraulic cylinder 42 accommodated in the load sleeve 10 of the constant suspension mechanism 1 is actuated. By actuating the hydraulic cylinder 42, the constant suspension mechanism 1 is so adjusted that the desired and actual values are the same, or nearly the same. Subsequently, the servo-hydraulic mechanism 41 is deactivated, while the pressure in the hydraulic cylinder 42 is reduced, so that the load is again carried exclusively by the constant suspension mechanism 1. Preferably, the control is effected until the desired compensation takes a value situated within an adjustable range of tolerance. Should the control operation not be successfully performed within a predetermined time, e.g., two (2) minutes, it is interrupted and an alarm signal is initiated.

Although a preferred embodiment of the invention has been specifically illustrated and described herein, it is to be understood that minor variations may be made in the apparatus without departing from the spirit and scope of the invention, as defined in the appended claims.

I claim:

1. A suspension system for supporting loads, such as pipes, under generally constant tension comprising a main spring system including a main spring constructed and arranged between a suspension portion and a load-bearing portion for applying spring-biasing forces to the suspension portion in a predetermined direction, an additional spring system including an additional spring constructed and arranged to compensate for variations in the spring-biasing forces of the main spring, cam and cam follower means between said main and additional springs and responsive to main spring-loading to selectively increase or decrease the biasing forces of the additional spring, and hydraulically operated auxiliary means for applying a supplementary predetermined biasing force to selectively increase or decrease the biasing forces of said main spring in said predetermined direction and a direction opposite thereto.

2. The suspension system as defined in claim 1 wherein said hydraulically operated auxiliary means is an integrated part of said main spring system.

3. The suspension system as defined in claim 1 wherein said main spring system includes a load sleeve carrying one of said cam and cam follower means, and said hydraulically operated auxiliary means is at least partially housed within said load sleeve.

4. The suspension system as defined in claim 1 wherein said main spring system includes a load sleeve carrying one of said cam and cam follower means, another of said cam and cam follower means being disposed between said additional spring and said one cam and cam follower means, a load sleeve adapted to support a load therefrom, said load sleeve being biased by said main spring and being biased by said additional spring through said cam and cam follower means, and said hydraulically operated auxiliary means is at least partially housed within said load sleeve.

5. The suspension system as defined in claim 1 wherein said main spring system includes a load sleeve carrying one of said cam and cam follower means, another of said cam and cam follower means being disposed between said additional spring and said one cam and cam follower means, a load sleeve adapted to support a load therefrom, said load sleeve being biased by said main spring and being biased by said additional spring through said cam and cam follower means, said hydraulically operated auxiliary means is at least partially housed within said load sleeve, said hydraulically operated auxiliary means includes a cylinder and an associated piston rod, and one of said cylinder and piston rod is connected to said load sleeve.

6. The suspension system as defined in claim 1 wherein said main spring system includes a load sleeve carrying one of said cam and cam follower means, another of said cam and cam follower means being disposed between said additional spring and said one cam and cam follower means, a load sleeve adapted to support a load therefrom, said load sleeve being biased by said main spring and being biased by said additional spring through said cam and cam follower means, said hydraulically operated auxiliary means is at least partially housed within said load sleeve, said hydraulically operated auxiliary means includes a cylinder and an associated piston rod, and said piston rod is connected to said load sleeve.

7. The suspension system as defined in claim 1 including means for detecting deviation from a desired value of the position of the suspension system, and means responsive to said detecting means for effecting operation of said hydraulically operated auxiliary means until said suspension system reaches its desired value.

8. The suspension system as defined in claim 1 including means for detecting deviation of the position of the suspension system by detecting deviation from a desired value of a characteristic of the load supported by the suspension system, and means responsive to said detecting means for effecting operation of said hydraulically operated auxiliary means until said suspension system reaches its desired value.

9. The suspension system as defined in claim 1 including means for detecting deviation from a desired value of the position of the suspension system, means responsive to said detecting means for effecting operation of said hydraulically operated auxiliary means until said suspension system reaches its desired value, said main spring system includes a load sleeve carrying one of said cam and cam follower means, and said deviation detecting means is constructed and arranged to detect different relative positions of said load sleeve.

10. The suspension system as defined in claim 1 including means for detecting deviation of the position of the suspension system by detecting deviation from a desired value of a characteristic of the load supported by the suspension system, means responsive to said detecting means for effecting operation of said hydraulically operated auxiliary means until said suspension system reaches its desired value, and said deviation detecting means is temperature-responsive.

11. The suspension system as defined in claim 1 wherein said main spring system includes a load sleeve carrying one of said cam and cam follower means, another of said cam and cam follower means being disposed between said additional spring and said one cam and cam follower means, a load sleeve adapted to support a load therefrom, and said hydraulically operated auxiliary means is at least partially housed within said load sleeve.

12. The suspension system as defined in claim 11 including means for detecting deviation from a desired value of the position of the suspension system, and means responsive to said detecting means for effecting operation of said hydraulically operated auxiliary means until said suspension system reaches its desired value.

13. The suspension system as defined in claim 11 including means for detecting deviation of the position of the suspension system by detecting deviation from a desired value of a characteristic of the load supported by the suspension system, and means responsive to said detecting means for effecting operation of said hydraulically operated auxiliary means until said suspension system reaches its desired value.

14. The suspension system as defined in claim 11 including means for detecting deviation from a desired value of the position of the suspension system, means responsive to said detecting means for effecting operation of said hydraulically operated auxiliary means until said suspension system reaches its desired value, said main spring system includes a load sleeve carrying one of said cam and cam follower means, and said deviation detecting means is constructed and arranged to detect different relative positions of said load sleeve.

15. The suspension system as defined in claim 11 including means for detecting deviation of the position of the suspension system by detecting deviation from a desired value of a characteristic of the load supported by the suspension system, means responsive to said detecting means for effecting operation of said hydraulically operated auxiliary means until said suspension system reaches its desired value, and said deviation detecting means is temperature-responsive.

16. The suspension system as defined in claim 1 wherein said main spring system includes a load sleeve carrying one of said cam and cam follower means, another of said cam and cam follower means being disposed between said additional spring and said one cam and cam follower means, a load sleeve adapted to support a load therefrom, said load sleeve being biased by said main spring and being biased by said additional spring through said cam and cam follower means, said hydraulically operated auxiliary means is at least partially housed within said load sleeve, said hydraulically operated auxiliary means includes a cylinder and an associated piston rod, and one of said cylinder and piston rod is at least partially housed within said load sleeve.

17. The suspension system as defined in claim 16 including means for detecting deviation from a desired value of the position of the suspension system, and means responsive to said detecting means for effecting operation of said hydraulically operated auxiliary means until said suspension system reaches its desired value.

18. The suspension system as defined in claim 16 including means for detecting deviation of the position of the suspension system by detecting deviation from a desired value of a characteristic of the load supported by the suspension system, and means responsive to said detecting means for effecting operation of said hydraulically operated auxiliary means until said suspension system reaches its desired value.

19. The suspension system as defined in claim 16 including means for detecting deviation from a desired value of the position of the suspension system, means responsive to said detecting means for effecting operation of said hydraulically operated auxiliary means until said suspension system reaches its desired value, said main spring system includes a load sleeve carrying one of said cam and cam follower means, and said deviation detecting means is constructed and arranged to detect different relative positions of said load sleeve.

20. The suspension system as defined in claim 16 including means for detecting deviation of the position of the suspension system by detecting deviation from a desired value of a characteristic of the load supported by the suspension system, means responsive to said detecting means for effecting operation of said hydraulically operated auxiliary means until said suspension system reaches its desired value, and said deviation detecting means is temperature-responsive.

* * * * *